R. MATSUDA.
FOCUSING HOOD FOR CAMERAS.
APPLICATION FILED JAN. 11, 1914.
1,141,970.
Patented June 8, 1915.
2 SHEETS—SHEET 1.
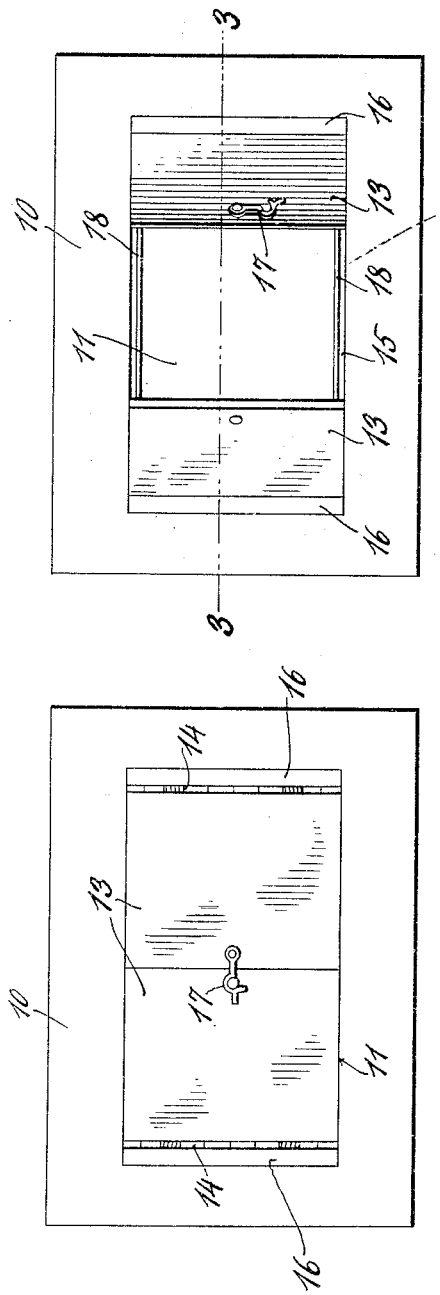
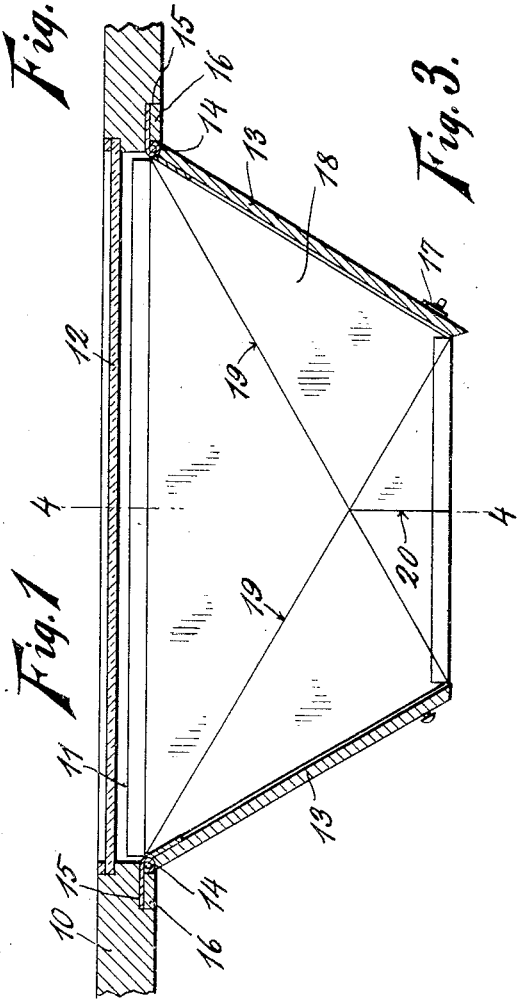
Inventor
Riichi Matsuda

R. MATSUDA.
FOCUSING HOOD FOR CAMERAS.
APPLICATION FILED JAN. 11, 1914.

1,141,970.

Patented June 8, 1915.
2 SHEETS—SHEET 2.

Inventor
Riichi Matsuda

Witnesses

UNITED STATES PATENT OFFICE.

RIICHI MATSUDA, OF CHICAGO, ILLINOIS.

FOCUSING-HOOD FOR CAMERAS.

1,141,970.   Specification of Letters Patent.   Patented June 8, 1915.

Application filed January 11, 1914. Serial No. 1,569.

*To all whom it may concern:*

Be it known that I, RIICHI MATSUDA, a subject of the Emperor of Japan, residing at Chicago, in the county of Cook and State of Illinois, have invented certain new and useful Improvements in Focusing-Hoods for Cameras, of which the following is a specification.

This invention relates to hoods for reducing or excluding light from the focusing surface of cameras in order that the image may be more clearly seen.

The invention has for its object to provide a hood of the kind stated which enables the use of the ordinary focusing cloth to be dispensed with, and which excludes a maximum amount of light from the focusing surface, and does not obstruct any part of such surface but leaves the entire surface exposed to the vision.

The invention also has for its object to provide a novel and improved hood of the kind stated which can be folded flat into small and compact form, and which unfolds automatically.

The herein stated objects are attained by means of a combination and arrangement of parts to be hereinafter described and claimed, reference being had to the accompanying drawings, in which—

Figure 4:
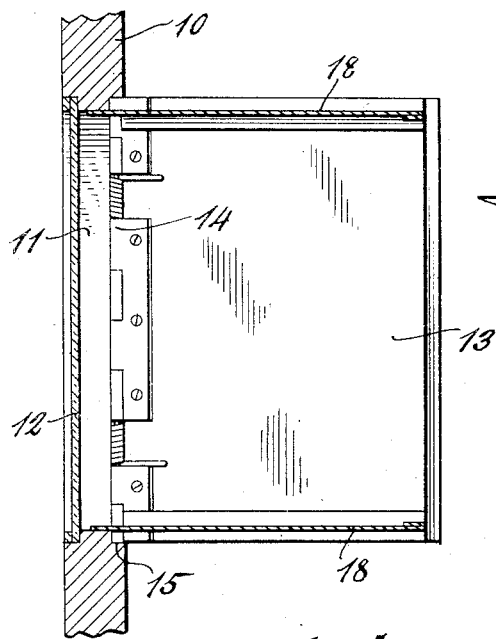

Figure 1 is an elevation of the back of a camera showing the application of the invention, the hood being shown closed; Fig. 2 is a similar view showing the hood open; Fig. 3 is an enlarged horizontal section on the line 3—3 of Fig. 2; Fig. 4 is a vertical section on the line 4—4 of Fig. 3, and Figs. 5 to 7 are diagrams showing the manner of folding the flexible portion of the curtain.

Referring specifically to the drawings 10 denotes the back of a camera having an opening 11 in which is mounted the usual ground glass or other focusing surface 12, the edge of the opening having a rabbet in which the glass is secured in any suitable manner. Behind the glass are mounted two opposite doors or shutters 13, which also form a part of the hood for reducing or excluding light from the glass. These doors are provided with spring hinges 14 so that they have a normal tendency to swing open. The rear portion of the edge of the opening 11 has a rabbet 15 in which the hinges 14 seat, said rabbet being of such depth that the doors, when closed, are flush with the outer surface of the part 10. The hinge parts which seat in the rabbet are concealed by cover strips 16. A suitable latch 17 is provided for holding the doors closed. The doors are so dimensioned that they form a complete closure for the opening 11, their free edges meeting when closed. The doors 13 are connected at the top and bottom by foldable curtains 18. These curtains are made of sheets of leather or some other suitable flexible, light-excluding material, of trapezoidal shape. The base or widest portions of the sheets correspond to the width of the opening 11, and the side edges of the sheets correspond to the width of the doors. The base portions of the sheets are secured to the part 10 in the rabbet 15, and their side edges are secured to the edges of the door, one sheet being secured to the top rabbet 15 and the top edges of the doors, and the other sheet being secured to the bottom rabbet and the bottom edges of the doors. The sheets are secured by gluing or otherwise fastening the aforesaid base and side portions to the rabbet 15 and the doors, respectively. The sheets are thus mounted between the doors with one edge free. The width of this free edge is less than the width of the base portion of the sheets, and thus governs the extent the doors may be swung open, the sheets being shaped so that the doors open to substantially 60 degrees, this being the angle which the side edges of the sheets extend with respect to the base portion. The free edges of the sheets are reinforced by doubling the same.

Figure 5:
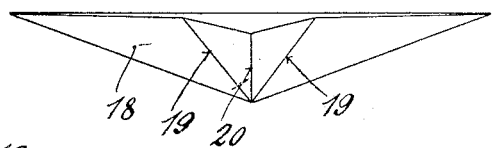
Figure 6:
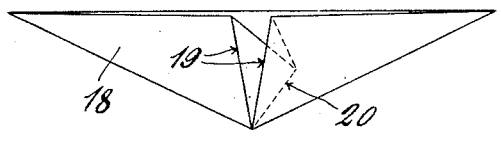
Figure 7:
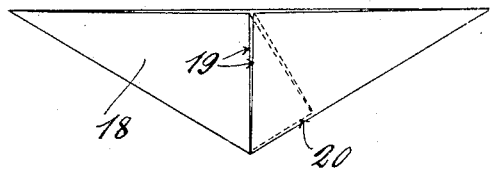

In order that the sheets 18 may fold into small and compact form when the doors 13 are closed, each sheet has diagonal creases 19 joining the corners, and at the intersection of these creases, a crease 20 extends therefrom to the short free edge of the sheet, perpendicular to said edge. By creasing the sheet in this manner, it folds as follows when the doors are swung closed: That portion of the sheet which is bounded by the free edge and the creases 19 folds together at the middle on the crease 20, and as the doors continue to swing to closed position, the sheet assumes a triangular form, the surface bounded by the base portion and the creases 19 swinging down behind the doors, and the surfaces bounded by the creases 19 and the side edges of the sheet folding down on top thereof, with the first described folded portion lying between the two last mentioned folded parts. Figs. 5 to 7 clearly illustrate this operation. The sheet is now folded flat behind the doors, and when they swing open the sheets unfold and cover the spaces between the top and bottom edges of the doors, thus forming with the latter the focusing hood. The sheets fold automatically, and the unfolding as well as the opening of the doors is also automatic by reason of the spring hinges 14.

The device herein described can be readily applied to any ordinary camera, except the reflex type of cameras, and it is simple and inexpensive, and effectually serves the purpose for which it is designed. The doors 13 are shown vertically, but they may be hung horizontally, in which event the curtains 18 will be at the sides instead of at the top and bottom.

I claim:

1. In a focusing hood for cameras, the combination with the back of the camera having an opening provided with a focusing surface; of a pair of opposite light-excluding doors for said opening, said doors meeting at their free edges when closed and forming a closure for the opening, and flexible light-excluding curtains secured at opposite sides to the edges of the doors which extend between the meeting and the hinge edges thereof, and closing up the space between said edges when the doors are open.

2. In a focusing hood for cameras, the combination with the back of the camera having an opening provided with a focusing surface; of a pair of opposite light-excluding doors for said opening, said doors meeting at their free edges when closed and forming a closure for the opening, and flexible light-excluding curtains secured at opposite sides to the edges of the doors which are adjacent to the meeting and the hinge edges thereof, and closing up the space between said edges when the doors are open, said curtains folding behind the doors when the latter are closed.

3. In a focusing hood for cameras, the combination with the back of the camera having an opening provided with a focusing surface; of a pair of opposite light-excluding doors for said opening, said doors meeting at their free edges when closed and forming a closure for the opening, and flexible light-excluding curtains secured at one edge to the frame and at their two adjacent edges to the edges of the doors which extend between the meeting and the hinge edges thereof, said curtains closing up the space between said edges when the doors are open.

4. In a focusing hood for cameras, the combination with the back of the camera having an opening provided with a focusing surface; of a pair of opposite light-excluding doors for said opening, said doors meeting at their free edges when closed and forming a closure for the opening, and flexible light-excluding curtains secured at one edge to the frame and at their two adjacent edges to the edges of the doors which extend between the meeting and the hinge edges thereof, said curtains closing up the space between said edges when the doors are open, and being foldable behind the doors when the latter are closed.

5. In a focusing hood for cameras, the combination with the back of the camera having an opening provided with a focusing surface; of a pair of opposite light-excluding doors for said opening, said doors meeting at their free edges when closed and forming a closure for the opening, and flexible light-excluding curtains secured at one edge to the frame and at their two adjacent edges to the edges of the doors which extend between the meeting and the hinge edges thereof, said curtains closing up the space between said edges when the doors are open, each curtain having diagonal creases extending between its corners, and a crease extending from the intersection of said diagonal creases to the free edge of the curtain and perpendicular to said edge, on which creases the curtain folds.

6. In a focusing hood for cameras, the combination with the back of the camera having an opening provided with a focusing surface; of a pair of opposite light-excluding doors for said opening said doors meeting at their free edges when closed and forming a closure for the opening, and flexible light-excluding curtains of trapezoidal form secured at one edge to the frame and at their two adjacent edges to the edges of the doors which extend between the meeting and the hinge edges thereof, said curtain closing up the space between said edges when the doors are open, and being foldable behind the doors when the latter are closed, each curtain having diagonal creases extending between its corners, and a crease extending from the intersection of said diagonal creases to the free edge of the curtain and perpendicular to said edge, on which creases the curtain folds.

7. In a focusing hood for cameras, the combination with the back of the camera having an opening provided with a focusing surface; of a pair of opposite light-excluding spring-hinged doors for said opening, said doors meeting at their free edges when closed and forming a closure for the opening, and flexible light-excluding curtains secured at opposite sides to the edges of the doors which
5 extend between the meeting edges thereof, and closing up the space between said edges when the doors are open.

In testimony whereof I affix my signature in presence of two witnesses.

RIICHI MATSUDA.

Witnesses:
S. J. LEHRER,
H. G. BATCHELOR.

Copies of this patent may be obtained for five cents each, by addressing the "Commissioner of Patents, Washington, D. C."